United States Patent
Jiang et al.

(10) Patent No.: US 11,796,695 B1
(45) Date of Patent: Oct. 24, 2023

(54) EVALUATION METHOD FOR EVALUATING PRECIPITATION-INDUCED LANDSLIDE DISASTER LOSS UNDER CLIMATE CHANGE

(71) Applicant: Nanjing University of Information Science & Technology, Nanjing (CN)

(72) Inventors: Tong Jiang, Nanjing (CN); Qigen Lin, Nanjing (CN); Guojie Wang, Nanjing (CN); Yanjun Wang, Nanjing (CN); Buda Su, Beijing (CN); Jianqing Zhai, Beijing (CN); Jinlong Huang, Nanjing (CN)

(73) Assignee: NANJING UNIVERSITY OF INFORMATION SCIENCE & TECHNOLOGY, Nanjing (CN)

( * ) Notice: Subject to any disclaimer, the term of this patent is extended or adjusted under 35 U.S.C. 154(b) by 0 days.

(21) Appl. No.: 18/122,924

(22) Filed: Mar. 17, 2023

(30) Foreign Application Priority Data

Apr. 20, 2022 (CN) .......................... 202210414169.6

(51) Int. Cl.
*G01V 1/00* (2006.01)
*G01W 1/14* (2006.01)

(52) U.S. Cl.
CPC ............... *G01V 1/008* (2013.01); *G01W 1/14* (2013.01); *G01V 2210/612* (2013.01); *G01W 2201/00* (2013.01)

(58) Field of Classification Search
CPC .................................. G01W 1/14; G01W 1/008
(Continued)

(56) References Cited

U.S. PATENT DOCUMENTS

| | | | |
|---|---|---|---|
| 2018/0045853 A1* | 2/2018 | Kirschbaum | G01W 1/14 |
| 2019/0163847 A1* | 5/2019 | Oh | G01W 1/10 |

(Continued)

FOREIGN PATENT DOCUMENTS

| | | |
|---|---|---|
| CN | 107092653 A | 8/2017 |
| WO | 2018092031 A1 | 5/2018 |

OTHER PUBLICATIONS

Nanjing University of Information Engineering (Applicant), Original claims (allowed) for CN202210414169.6, Apr. 20, 2022.
(Continued)

*Primary Examiner* — Ricky Go
(74) *Attorney, Agent, or Firm* — Zhigang Ma (57) ABSTRACT

An evaluation method for evaluating a precipitation-induced landslide disaster loss under climate change is provided. The evaluation method belongs to the technical field of geological disaster prevention and treatment. The evaluation method uses a physical process based model, in considering of spatial heterogeneity of land-surface features of grids in the area, to obtain precipitation thresholds corresponding to the respective grids in the area having the spatial heterogeneity. Historical data and climate model data are taken in combination to select suitable climate models, and the model then is used to simulate landslide prone zones and possible influence zones caused by landslides. An influence zones simulated by the evaluation method can better match disaster loss grid data, which can solve the problem that climate change scenarios and influence of landslide are difficult to be evaluated in landslide disaster evaluation.

9 Claims, 4 Drawing Sheets

(58) Field of Classification Search
USPC .......................................................... 702/15
See application file for complete search history.

(56) References Cited

U.S. PATENT DOCUMENTS

| | | | |
|---|---|---|---|
| 2019/0272739 A1* | 9/2019 | Tsunoda | G06N 7/01 |
| 2021/0080616 A1* | 3/2021 | Ishihara | G01W 1/10 |
| 2023/0046111 A1* | 2/2023 | Ramesh | G01V 1/181 |
| 2023/0152487 A1* | 5/2023 | Erinjippurath | G06Q 40/08 |
| | | | 702/3 |

OTHER PUBLICATIONS

CNIPA, Notification to grant patent right for invention in CN202210414169.6, dated May 24, 2022.

* cited by examiner

EVALUATION METHOD FOR EVALUATING PRECIPITATION-INDUCED LANDSLIDE DISASTER LOSS UNDER CLIMATE CHANGE

TECHNICAL FIELD

The disclosure relates to the technical field of geological disaster prevention and treatment, and particularly to an evaluation method for evaluating a precipitation-induced landslide disaster loss under climate change.

BACKGROUND

Landslide is a kind of geological disaster, which seriously endangers the production and life of local residents. China is prone to landslide geological disasters, and the landslide geological disasters cause huge economic losses and casualties every year. How to evaluate the influence of climate change on landslides and the influence of landslides on disaster losses under climate change is a very complex and challenging issue.

SUMMARY

In order to overcome shortcomings of the prior art, the disclosure provides an evaluation method for evaluating a precipitation-induced landslide disaster loss under climate change, so as to solve the problem that climate change scenarios and the influence of landslide are difficult to be evaluated in landslide disaster evaluation.

A technical solution of the disclosure is that: an evaluation method for evaluating a precipitation-induced landslide disaster loss under climate change, including the following steps 1 to 9:

step 1: taking land-surface features of grids in an area as prediction variables, taking observation station precipitation sequence data of the area as a dependent variable, and performing interpolation on observation precipitation data with coarse-resolution of the grids in the area to generate high-resolution (the high-resolution also can be understood as high-precision in the disclosure) precipitation sequence spatial distribution data based on a spline function method;

step 2: inputting the high-resolution precipitation sequence spatial distribution data and the prediction variables into a distributed landslide stability model based on a physical process, simulating a dangerous zone and a landslide influence zone of landslide disaster according to corresponding precipitation thresholds of the grids obtained by simulating that a safety coefficient on each of the grids in the area reaches an instability threshold, and obtaining different induced-landslide precipitation thresholds caused by different land-surface features of the grids in the area;

step 3: performing comparative analysis on the induced-landslide precipitation thresholds and historical landslide data, calculating critical precipitation thresholds inducing historical landslides, calculating false alarm rates of induced-landslide precipitation threshold in the historical landslide data, and then obtaining a result corresponding to a minimum one of the false alarm rates by a trial-and-error method, and optimizing precipitation threshold conditions that induce landslides on the grids in the area;

step 4: acquiring global twenty-four climate models each with four climate change scenarios, and climate grid data thereof including historical grid data and future grid data; processing the historical grid data into high-resolution historical precipitation sequence spatial distribution data according to the spline function method of step 1; and processing the future grid data into high-resolution future precipitation sequence spatial distribution data according to the spline function method of step 1;

step 5: inputting the high-resolution historical precipitation sequence spatial distribution data and historical land-surface features as conditions into the distributed landslide stability model, and obtaining different historical induced-landslide precipitation thresholds on the grids of the climate models;

step 6: comparing the historical induced-landslide precipitation thresholds on the grids of the different climate models obtained in the step 5 with induced-landslide precipitation thresholds on the grids in the area obtained according to the observation precipitation data and optimized in the step 3, and thereby obtaining climate model historical grid precipitation thresholds;

step 7: according to the climate model historical grid precipitation thresholds obtained in the step 6, in combination with the distributed landslide stability model based on the physical process, obtaining a dangerous zone and a landslide influence zone of landslide disaster in a historical period; performing comparison on the historical induced-landslide precipitation thresholds on the grids of the climate models and calculating induced-landslide frequencies on the respective grids of the climate models in the historical period; then counting disaster loss grid data in the landslide influence zone in the historical period, and based on induced-landslide frequencies on the respective grids of the climate models in the historical period, calculating landslide disaster losses on the grids of the climate models in the historical period; wherein a formula for calculating the landslide disaster losses on the grids of the climate models in the historical period is as follows:

$$E_{his\_pop} = \sum_{i=1}^{n} A_{i\_his\_land} * F_{i\_his\_land} * P_{i\_his\_land}$$

where $E_{his\text{-}pop}$ represents the landslide disaster loss on the grids of the climate model in the historical period under the climate change scenarios; n represents a total amount of the grids in the area; i represents an index of each of the grids; $A_{i\_his\_land}$ indicates an i-th grid whether is in the landslide influence zone; if the i-th grid is in the landslide influence zone, a value of the $A_{i\_his\_land}$ is 1; if the i-th grid is not in the landslide influence zone, the value of the $A_{i\_his\_land}$ is 0; $F_{i\_his\_land}$ represents a predicted frequency of landslide disaster occurrence of the i-th grid; and $P_{i\_his\_land}$ is a landslide disaster loss on the i-th grid;

step 8: acquiring a spatial distribution of a simulated disaster-bearing body in a future scenario, based on the climate model historical grid precipitation thresholds obtained in the step 6, calculating landslide disaster losses on the grids of the different climate models in a future period according to a process same as that of step 7, wherein a formula of calculating the landslide disaster losses on the grids of the different climate models in the future period is as follows:

$$E_{fu\_pop} = \sum_{i=1}^{n} S_{i\_fu\_land} * R_{i\_fu\_land} * H_{i\_fu\_land}$$

where $E_{fu\text{-}pop}$ represents the landslide disaster loss on the grids of the climate model in the future period under the climate change scenarios; n represents the total amount of the grids in the area; i represents the index of each of the grids; $S_{i\_fu\_land}$ indicates an i-th grid whether is in a landslide influence zone in the future period; if the i-th grid is in the landslide influence zone in the future period, a value of the $S_{i\_fu\_land}$ is 1; if the i-th grid is not in the landslide influence zone in the future period, the value of the $S_{i\_fu\_land}$ is 0; $R_{i\_fn\_land}$ represents a predicted frequency of landslide disaster occurrence of the i-th grid; and $H_{i\_fu\_land}$ is a landslide disaster loss on the i-th grid in the future period; and step 9: evaluating a change of landslide disaster loss under climate change, and using a multi-climate model merging method to calculate a merged result of the twenty-four climate models; wherein a formula for the multi-climate model merging method is as follows:

$$P_{mul} = \sum_{k=1}^{K} W_k * M_k$$

where represents the merged result of the climate models as calculated; k represents an index of each of the climate models; K represents a total amount of the climate models, and a value of the K is 24; $W_k$ represents a weighting factor of a k-th climate model among the climate models; and $M_k$ represent a result of the k-th climate model.

In an embodiment, in the step 1, the land-surface features include features of topography, surface coverings, geology and soil.

In an embodiment, in the step 1, the spline function method is formed based on a thin-plate spline theory and a climate data curved surface fitting theory and realized by using a PYTHON programming language to call an ANUSPLIN software.

In an embodiment, in the step 2, the distributed landslide stability model simulates a precipitation-infiltration process to establish a relationship between the safety coefficient and precipitation based on a limit equilibrium method of infinite slope.

In an embodiment, a formula of calculating the false alarm rate in the step 3 is as follows:

False alarm rate=wrongly predicted number of landslide occurrence/a total occurrence number of the historical landslides.

In an embodiment, the step 3 further includes: checking an effect of the induced-landslide precipitation thresholds.

In an embodiment, the four climate change scenarios in the step 4 include socioeconomic pathway 1 (SSP1)-2.6, SSP2-4.5, SSP3-7.0 and SSP5-8.5; and there are disaster loss grid data under each of pathways being SSP1-2.6, SSP2-4.5, SSP3-7.0 and SSP5-8.5.

In an embodiment, in the step 9, a formula of calculating the weighting factor $W_k$ of the k-th climate model among the climate models in the multi-climate model merging method is as follows:

$$W_k = \frac{C_k^\alpha}{\sum_{k=1}^{K} C_k^\alpha}$$

where $C_k^\alpha$ represents a correlation between the climate model and observation grid data; a value of a weight $\alpha$ is an integer in a range of 1 to 50; and the higher the correlation between the climate model and the observation grid data, the greater of the value of the weight $\alpha$.

Beneficial effects of the disclosure are as follows.

An evaluation method for evaluating a precipitation-induced landslide disaster loss under climate change is provided. The evaluation method uses a physical process based model, in considering of spatial heterogeneity of the land-surface features (e.g., topography, geology, soil, etc.) of each grid in the area, to obtain the precipitation thresholds corresponding to the respective grids in the area having spatial heterogeneity.

The evaluation method combines historical data and climate model data to select suitable climate models, which can better adapt to evaluation of influence of climate change in the area.

The evaluation method uses the model to simulate landslide prone areas and possible rush-out and influence areas of landslide. In landslide susceptibility evaluations in the prior art, most of them only calculate a sporadic distribution of landslide occurrence, but the possible influence zones on our human society caused by a landslide from the beginning of occurrence to the end of rushing out has not been simulated. The influence zones simulated by the evaluation method of the disclosure can better match the disaster loss grid data, which can solve the problem that climate change scenarios and influence of landslide are difficult to be evaluated in landslide disaster evaluation.

DETAILED DESCRIPTION OF EMBODIMENTS

The disclosure will be further described in detail with reference to the attached drawings and embodiments. It should be understood that specific embodiments described herein are only used to explain the disclosure, not to limit the disclosure. It should also be noted that for the convenience of description, only parts relevant to the disclosure are shown in the attached drawings.

It should be noted that the illustrated embodiments in the disclosure and features in the illustrated embodiments can be combined with each other on the prerequisite of being without conflict. The disclosure will be described in detail with reference to the attached drawings and embodiments.

In some embodiments of the disclosure, the disclosure provides an evaluation method for evaluating a precipitation-induced landslide disaster loss under climate change, including the following steps 1 to 9.

Step1: considering influence variables of topography elevation, curvature, slope, geology, soil and other factors, then taking these influence variables as prediction variables or covariates of grids in the area; taking observation station precipitation sequence data of the area as a dependent variable, and performing interpolation on observation precipitation data with coarse-resolution of the grids in the area to generate high-resolution precipitation sequence spatial distribution data based on a spline function method, and the precipitation including rainfall, snowfall and other climates.

Step 2: inputting the high-resolution precipitation sequence spatial distribution data obtained in the step 1 and the prediction variables (Topography, geology, soil and surface coverings, etc.) into a distributed landslide stability model based on a physical process, simulating corresponding precipitation thresholds of the grids obtained by a safety coefficient on each of the grids in the area reaches an instability threshold, obtaining different induced-landslide precipitation thresholds caused by different land-surface features (Topography, geology, soil and surface coverings, etc.) of the grids in the area; where the distributed landslide stability model simulates a precipitation-infiltration process to establish a relationship between the safety coefficient and the precipitation based on a limit equilibrium method of infinite slope.

Step 3: performing comparative analysis on the induced-landslide precipitation thresholds and historical landslide data, calculating critical precipitation thresholds inducing historical landslides, calculating false alarm rates of induced-landslide precipitation threshold in the historical landslide data in a database, and then obtaining a result corresponding to a minimum one of the false alarm rates by a trial-and-error method, and optimizing precipitation threshold conditions that induce landslides on the grids in the area.

Step 4: acquiring global twenty-four climate models each with four climate change scenarios, and climate grid data thereof including historical grid data and future grid data; processing the historical grid data into high-resolution historical precipitation sequence spatial distribution data according to the spline function method of the step 1; and processing the future grid data into high-resolution future precipitation sequence spatial distribution data according to the spline function method of the step 1.

Step 5: inputting the high-resolution historical precipitation sequence spatial distribution data and historical land-surface features as conditions into the distributed landslide stability model, and obtaining historical induced-landslide precipitation thresholds on the grids of different climate models.

Step 6: comparing the historical induced-landslide precipitation thresholds on the grids of the different climate models obtained in the step 5 with induced-landslide precipitation thresholds on the grids in the area obtained according to the observation precipitation data and optimized in the step 3, selecting climate models close to the observation precipitation data, and thereby obtaining climate model historical grid precipitation thresholds.

Step 7: according to the climate model historical grid precipitation thresholds obtained in the step 6, in combination with the distributed landslide stability model based on the physical process, obtaining a dangerous zone and a landslide influence zone of landslide disaster in a historical period; performing comparison on the historical induced-landslide precipitation thresholds on the grids of the climate models and calculating induced-landslide frequencies on the respective grids of the climate models in the historical period; then counting disaster loss grid data in the landslide influence zone in the historical period, and based on induced-landslide frequencies on the respective grids of the climate models in the historical period, calculating landslide disaster losses on the grids of the climate models in the historical period; where the landslide disaster losses include casualties, building collapse, crop damage and others; and a formula for calculating the landslide disaster losses on the grids of the climate models in the historical period is as follows:

$$E_{his\_pop} = \sum_{i=1}^{n} A_{i\_his\_land} * F_{i\_his\_land} * P_{i\_his\_land};$$

where $E_{his\text{-}pop}$ represents the landslide disaster loss on the grids of the climate model in the historical period under the climate change scenarios; n represents a total amount of the grids in the area; i represents an index of each of the grids; $A_{i\_his\_land}$ indicates an i-th grid whether is in the landslide influence zone; if the i-th grid is in the landslide influence zone, a value of the $A_{i\_his\_land}$ is 1; if the i-th grid is not in the landslide influence zone, the value of the $A_{i\_his\_land}$ is 0; $F_{i\_his\_land}$ represents a predicted frequency of landslide disaster occurrence of the i-th grid; and $P_{i\_his\_land}$ is a landslide disaster loss on the i-th grid.

Step 8: acquiring a spatial distribution of a simulated disaster-bearing body in a future scenario, based on the climate model historical grid precipitation thresholds obtained in the step 6, calculating landslide disaster losses on the grids of the climate models in a future period according to a process same as that of step 7, wherein a formula of calculating the landslide disaster losses on the grids of the climate models in the future period is as follows:

$$E_{fu\_pop} = \sum_{i=1}^{n} S_{i\_fu\_land} * R_{i\_fu\_land} * H_{i\_fu\_land};$$

where $E_{fu\text{-}pop}$ represents the landslide disaster loss on the grids of the climate model in the future period under the climate change scenarios; n represents the total amount of the grids in the area; i represents the index of each of the grids; $S_{i\_fu\_land}$ indicates an i-th grid whether is in a landslide influence zone in the future period; if the i-th grid is in the landslide influence zone in the future period, a value of the $S_{i\_fu\_land}$ is 1; if the i-th grid is not in the landslide influence zone in the future period, the value of the $S_{i\_fu\_land}$ is 0; $R_{i\_fu\_land}$ represents a predicted frequency of landslide disaster occurrence of the i-th grid; and $H_{i\_fu\_land}$ is a landslide disaster loss on the i-th grid in the future period.

Step 9: evaluating a change of landslide disaster loss under climate change, and using a multi-climate model merging method to calculate a merged result of the twenty-four climate models; wherein a formula for the multi-climate model merging method is as follows:

$$P_{mul} = \sum_{k=1}^{K} W_k * M_k;$$

where represents the merged result of the climate models as calculated; k represents an index of each of the climate models; K represents a total amount of the climate models, and a value of the K is 24; $W_k$ represents a weighting factor of a k-th climate model among the climate models; and $M_k$ represents a result of the k-th climate model. Moreover, in an exemplary embodiment, the evaluation method for evaluating a precipitation-induced landslide disaster loss under climate change further includes a step of applying the merged result as a reference factor of geological disaster prevention and treatment.

Figure 1:
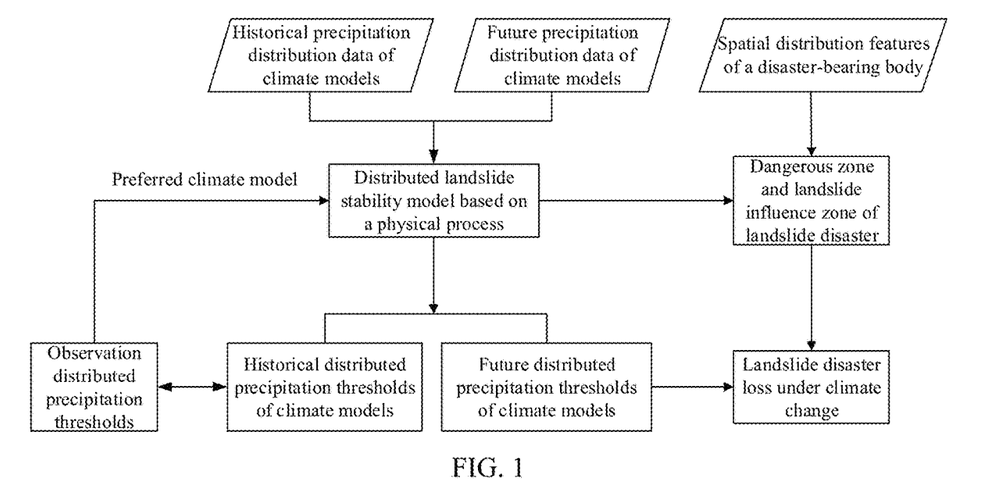
FIG. 1 illustrates a schematic flowchart of an evaluation method for evaluating a precipitation-induced landslide disaster loss under climate change.
Figure 2:
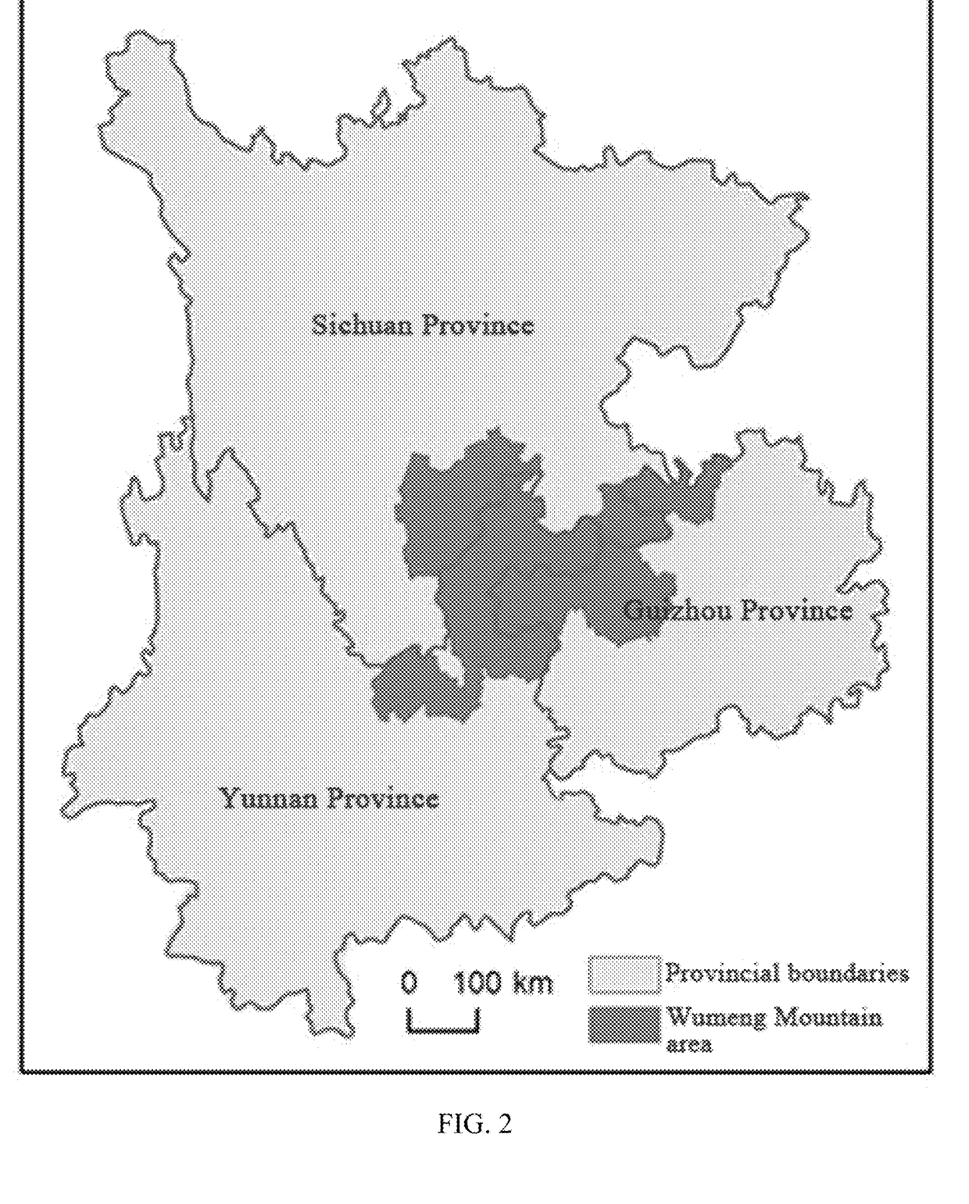
FIG. 2 illustrates a schematic topographic map of the Wumeng Mountain area.
Figure 3:
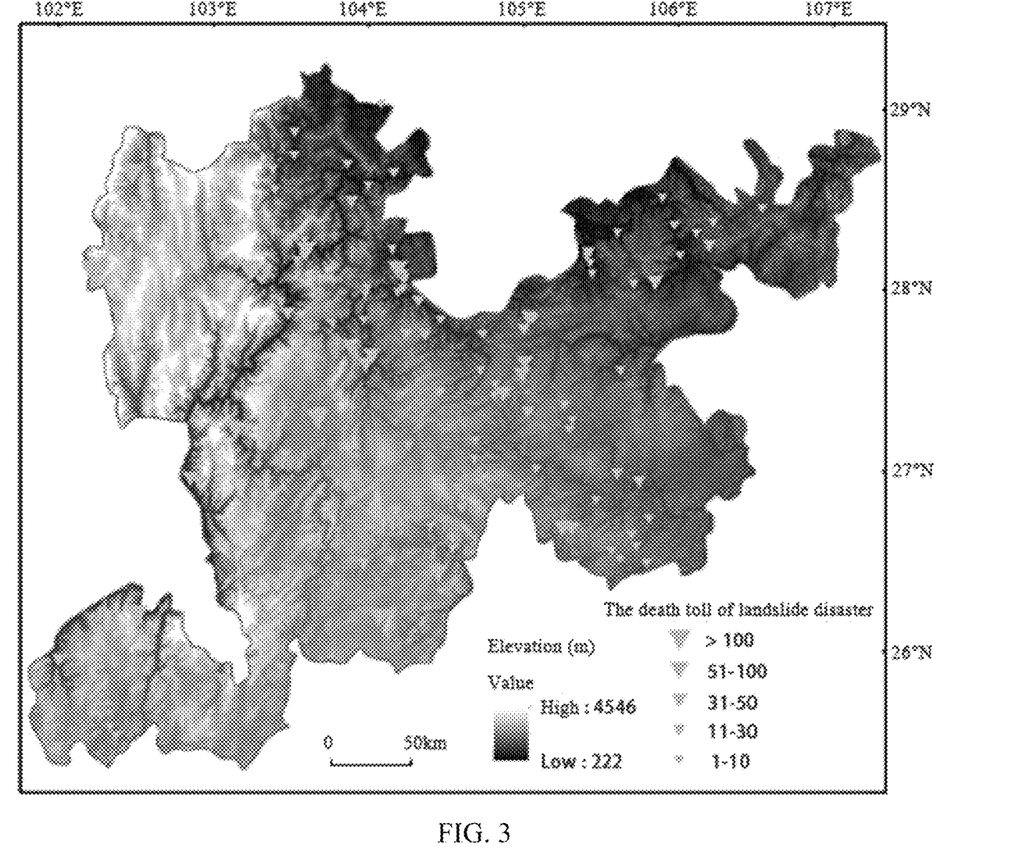
FIG. 3 illustrates a schematic spatial distribution of disaster losses (death tolls) caused by some historical catastrophic landslides in the Wumeng Mountain area.
Figure 4:
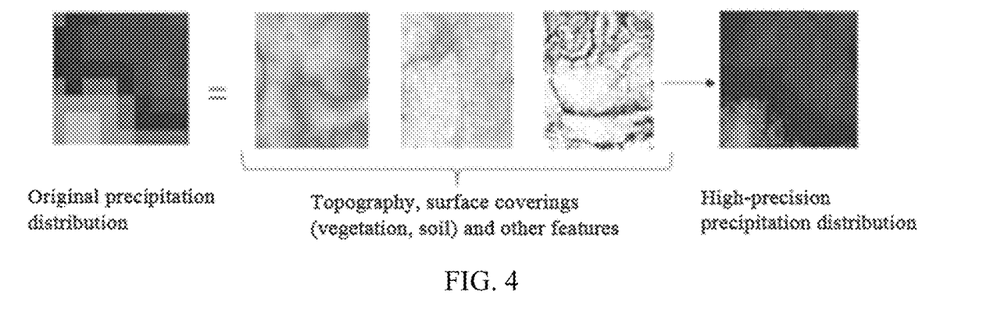
FIG. 4 illustrates a schematic calculation process of high-resolution precipitation distribution data.
Figure 5:
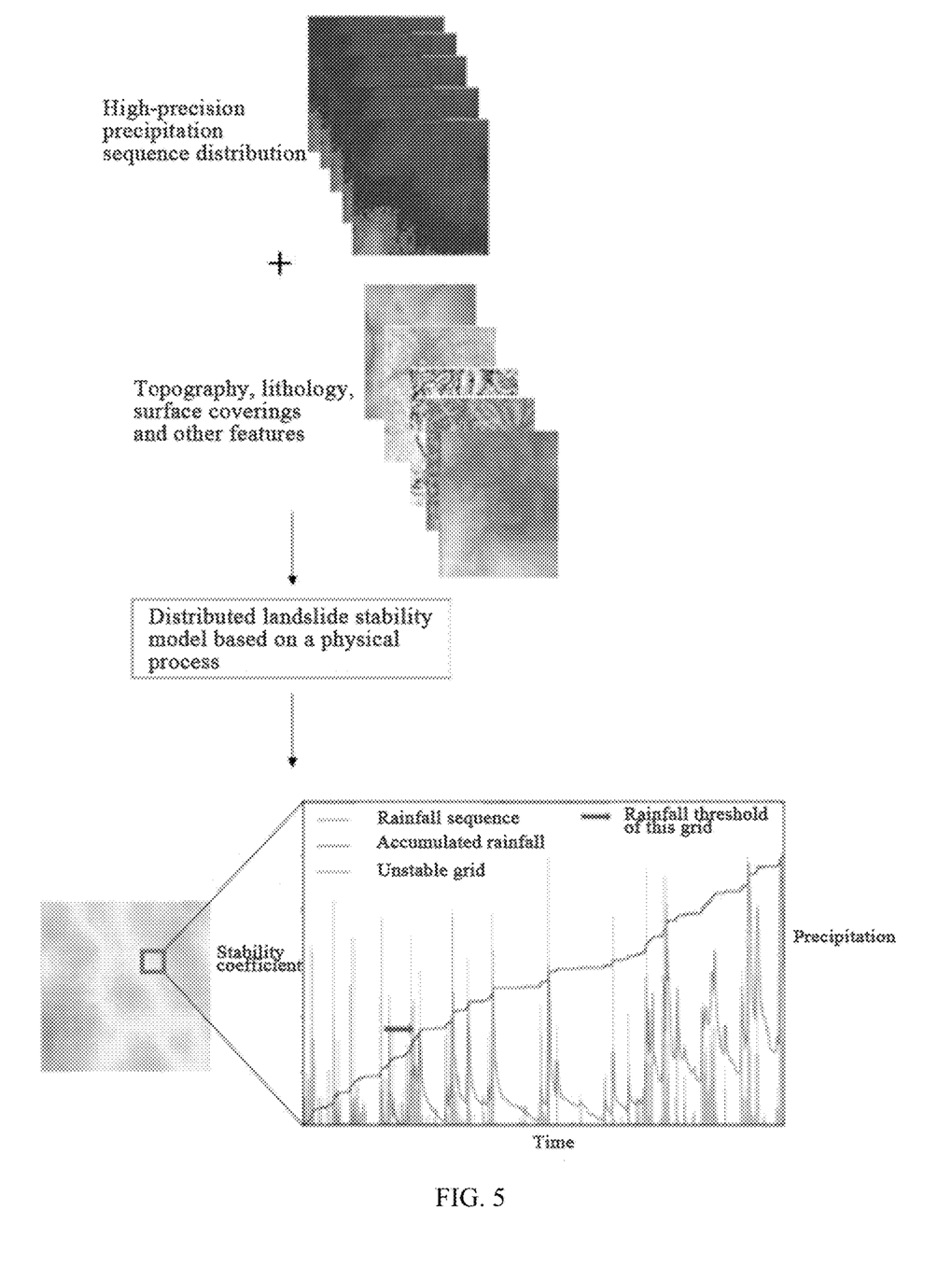
FIG. 5 illustrates a schematic diagram of simulating and identifying a precipitation threshold corresponding to each grid based on a physical model (in which, a grid at a certain spatial location was taken as an example).

The Wumeng Mountain area is selected as an area for study. The Wumeng Mountain area spans three provinces of Sichuan, Yunnan and Guizhou, covers a total area of 107,000 square kilometers, and includes 38 counties (cities, districts) in the adjacent areas of Yunnan, Guizhou and Sichuan provinces, as shown in FIG. 4. Due to steep topography and huge undulation of the Wumeng Mountain area, the Wumeng Mountain area is an area where landslide disasters are prone and frequent in China, and also one of areas with the most serious landslide disaster losses. According to the statistics of China's catastrophic landslide event database, the landslide disasters of the Wumeng Mountain area caused an average of about 45 deaths per year in years of 1950-2016. In the years of 2016 and 2017, there were landslide disasters occurred in Nayong county and Dafang county, both of which caused more than 20 deaths, as shown in FIG. 5. Landslide disaster losses also include damage to facilities, and economic losses. Moreover, considering that the study area has frequent disaster losses, backward economy, weak disaster prevention and mitigation capacity, prominent contradiction between disaster losses and resources and environment, and fragile ecological environment. The influence of landslide disaster on the social economy of the area is more serious, and thus it is of great significance to carry out an evaluation of landslide disaster loss under climate change scenarios in the Wumeng Mountain area.

Various data sources were collected, including the landslide disaster event database of the Wumeng Mountain area, the natural geographical environment influence factor data of the Wumeng Mountain area, meteorological observation data, simulation and prediction data of global climate models, and historical disaster loss census and distribution data. TABLE 1 lists some influence factors, and basic information and data sources of influence factors.

TABLE 1 data of some influence factors

| Category | Influence factor | Description |
|---|---|---|
| Climate | precipitation | Observation data |
| Geology and soil | Soil type | Soil type |
| | Lithology | Vector |
| | Distance from fracture zone | Vector |
| Topography | Elevation | ALOS PALSAR 12.5 m |
| | slope | 12.5 m resolution |
| | Terrain Curvature | 12.5 m resolution |
| | Slope aspect | 12.5 m resolution |
| Surface coverings | Normalized Difference Vegetation Index | Annual average Normalized Difference Vegetation Index |
| | Vegetation type | Vegetation type |

First of all, by considering the spatial heterogeneity of the surface features (topography, geology, soil, etc.) of grids in the Wumeng Mountain area, the topography data in the TABLE 1 employs the digital elevation data of advanced land observing satellite (ALOS) phased array L-band synthetic aperture radar (PALSAR) with 12.5 m resolution of the Japan aerospace research institute to invert and calculate the slope, terrain curvature, slope aspect, topography undulation, topography position and other land-surface features, interpolation is performed on observation precipitation data with coarse-resolution of the grids in the Wumeng Mountain area to generate current high-resolution precipitation sequence spatial distribution data based on a spline function method, as shown in FIG. 4. The spline function method is formed based on a thin-plate spline theory and a climate data curved surface fitting theory, and realized by using a PYTHON programming language to call an ANUSPLIN software.

Secondly, the obtained high-resolution precipitation sequence spatial distribution data and the prediction variables (the data of topography, geology, soil and surface covering) in the Wumeng Mountain area are input into the distributed landslide stability model (abbreviated as SLIDE model) based on a physical process. The SLIDE model simulates a precipitation-infiltration process to establish a relationship between the safety coefficient and the precipitation based on a limit equilibrium method of infinite slope. The SLIDE model takes a hydraulic slope direction as a sliding surface direction to establish a limit equilibrium equation, and takes the hydraulic slope direction as a potential sliding direction used to a landslide calculation module. Based on MATLAB programing language, the SLIDE model is called to simulate corresponding precipitation thresholds of the respective grids obtained by a safety coefficient on each of the grids in the Wumeng Mountain area reaches an instability threshold, thereby obtaining different induced-landslide precipitation thresholds caused by different land-surface features (e.g., topography, geology, soil and surface coverings, etc.) of the grids in the Wumeng Mountain area, i.e., obtaining precipitation thresholds corresponding to the grids in the Wumeng Mountain area with spatial heterogeneity. In other words, induced-landslide spatial distribution precipitation thresholds are obtained.

Thirdly, the obtained induced-landslide precipitation thresholds (i.e., the induced-landslide spatial distribution precipitation thresholds) in the Wumeng Mountain area and historical landslide data of the Wumeng Mountain area are performed with comparative analysis. Specifically, based on the precipitation distribution sequence data of each landslide event in a historical landslide database, critical precipitation thresholds inducing historical landslides and false alarm rates of induced-landslide precipitation threshold in the historical landslide data in the database are calculated. An effect of the obtained induced-landslide spatial distribution precipitation thresholds in the Wumeng Mountain area is checked/verified. Then a result corresponding to a minimum one of the false alarm rates is obtained by a trial-and-error method, and precipitation threshold conditions that induce landslides on the grids in the Wumeng Mountain area are optimized, as shown in FIG. 5. A formula of calculating the false alarm rate mentioned above is as follows:

False alarm rate=wrongly predicted number of landslide occurrence/a total occurrence number of the historical landslides.

Fourthly, global twenty-four climate models each currently with four climate change scenarios (SSP1-2.6, SSP2-4.5, SSP3-7.0, SSP5-8.5) are acquired, and herein SSP is an abbreviation of shared socioeconomic pathway. Historical grid data of multiple climate models are processed into high-resolution historical precipitation sequence spatial distribution data, the high-resolution historical precipitation sequence spatial distribution data and historical land-surface features (e.g., historical topography, geology and soil, etc.) as conditions are input into the SLIDE model, and historical induced-landslide precipitation thresholds on the grids of different climate models are obtained. The historical induced-landslide precipitation thresholds on the grids of the different climate models are compared with the induced-landslide precipitation thresholds on the grids in the Wumeng Mountain area obtained by the observation precipitation data, then climate models close to the observation precipitation data are selected.

TABLE 2

Information of the global twenty-four climate models
Global climate model name/Country or region

| | | |
|---|---|---|
| ACCESS-CM2/Australia | EC-Earth3-Veg/Europe | MPI-ESM1-2-HR/Germany |
| ACCESS-ESM1-5/Australia | EC-Earth3-Veg-LR/Europe | MPI-ESM1-2-LR/Germany |
| BCC-CSM2-MR/China | FGOALS-g3/China | MRI-ESM2-0/Germany |
| CanESM5/Canada | INM-CM4-8/Russia | NorESM2-LM/Norway |
| CESM2-WACCM/America | INM-CM5-0/Russia | NorESM2-MM/Norway |
| CMCC-CM2-SR5/Italy | IPSL-CM6A-LR/France | TaiESM1/Taiwan, China |
| CMCC-ESM2/Italy | KACE-1-0-G/South Korea | GFDL-ESM4/America |
| EC-Earth3/Europe | MIROC6/Japan | IITM-ESM/India |

Finally, according to climate model historical grid data of the selected climate models, in combination with the SLIDE model based on the physical process, a dangerous zone and a landslide influence zone of landslide disaster in the Wumeng Mountain area in a historical period are obtained. At the same time, comparison on the historical induced-landslide precipitation thresholds on the grids of different climate models is performed and induced-landslide frequencies on the respective grids of the climate models in the historical period are obtained. Simulated disaster loss distributions under a future scenario are selected from the disaster losses and economic prediction database of socio-economic pathways (SSPs), predicted disaster loss grid data under SSP1, SSP2, SSP3 and SSP5 are selected as disaster loss data under different climate change scenarios, then the disaster loss grid data in the landslide influence zone of the Wumeng Mountain area in the historical period is combined with induced-landslide frequencies on the respective grids of the different climate models in the historical period, landslide disaster losses on the grids of the different climate models in the historical period are calculated. Based on the climate model historical grid data of the selected climate models, a formula for calculating the landslide disaster losses on the grids of the different climate models in the historical period is as follows:

$$E_{his\_pop} = \sum_{i=1}^{n} A_{i\_his\_land} * F_{i\_his\_land} * P_{i\_his\_land}$$

Where $E_{his\text{-}pop}$ represents the landslide disaster loss on the grids of the climate model in the historical period under the climate change scenarios; n represents a total amount of the grids in the area; i represents an index of each of the grids; $A_{i\_his\_land}$ indicates an i-th grid whether is in the landslide influence zone; if the i-th grid is in the landslide influence zone, a value of the $A_{i\_his\_land}$ is 1; if the i-th grid is not in the landslide influence zone, the value of the $A_{i\_his\_land}$ is 0; $F_{i\_his\_land}$ represents a predicted frequency of landslide disaster occurrence of the i-th grid; and $P_{i\_his\_land}$ is a landslide disaster loss on the i-th grid.

For each global climate model, the landslide disaster loss under the climate change scenarios are calculated according to the following formula, and landslide disaster losses on the grids of different climate models in a future period are calculated. A formula of calculating the landslide disaster losses on the grids of the different climate models in the future period is as follows:

$$E_{fu\_pop} = \sum_{i=1}^{n} S_{i\_fu\_land} * R_{i\_fu\_land} * H_{i\_fu\_land}$$

Where $E_{his\text{-}pop}$ represents the landslide disaster loss on the grids of the climate model in the future period under the climate change scenarios; n represents the total amount of the grids in the area; i represents the index of each of the grids; $S_{i\_fu\_land}$ indicates an i-th grid whether is in a landslide influence zone in the future period; if the i-th grid is in the landslide influence zone in the future period, a value of the $S_{i\_fu\_land}$ is 1; if the i-th grid is not in the landslide influence zone in the future period, the value of the $S_{i\_fu\_land}$ is 0; $R_{i\_fu\_land}$ represents a predicted frequency of landslide disaster occurrence of the i-th grid; and $H_{i\_fu\_land}$ is a landslide disaster loss on the i-th grid in the future period.

Comparison is performed on the change of landslide disaster losses under the climate change of the climate models in the historical period and scenarios of Wumeng Mountain area, in combination with a multi-climate model merging method used to calculate a merged result of the climate models to complete the evaluation of the landslide disaster losses under the climate change. Moreover, the merged result subsequently can be used as a reference factor of geological disaster prevention and treatment in the Wumeng Mountain area.

The above description is only specific embodiments of the disclosure, but the scope of protection of the disclosure is not limited to this. Any modification or substitution that can be easily conceived by those skilled in the art within the technical scope disclosed by the illustrated embodiments of the disclosure should be included in the scope of protection of the disclosure. Therefore, the scope of protection of the disclosure should be subject to the scope of protection of the appended claims.

What is claimed is:

1. An evaluation method for evaluating a precipitation-induced landslide disaster loss under climate change, comprising:

step 1: taking land-surface features of grids in an area as prediction variables, taking observation station precipitation sequence data of the area as a dependent variable, and performing interpolation on observation precipitation data with coarse-resolution of the grids in the area to generate high-resolution precipitation sequence spatial distribution data based on a spline function method;

step 2: inputting the high-resolution precipitation sequence spatial distribution data and the prediction variables into a distributed landslide stability model based on a physical process, simulating a dangerous zone and a landslide influence zone of landslide disaster according to corresponding precipitation thresholds of the grids obtained by simulating that a safety coefficient on each of the grids in the area reaches an instability threshold, and obtaining induced-landslide precipitation thresholds caused by land-surface features of the grids in the area;

step 3: performing comparative analysis on the induced-landslide precipitation thresholds and historical landslide data, calculating critical precipitation thresholds inducing historical landslides, calculating false alarm rates of induced-landslide precipitation threshold in the historical landslide data, and then obtaining a result corresponding to a minimum one of the false alarm rates by a trial-and-error method, and optimizing precipitation threshold conditions that induce landslides on the grids in the area;

step 4: acquiring global twenty-four climate models each with four climate change scenarios, and climate grid data thereof including historical grid data and future grid data; processing the historical grid data into high-resolution historical precipitation sequence spatial distribution data according to the spline function method of step 1; and processing the future grid data into high-resolution future precipitation sequence spatial distribution data according to the spline function method of step 1;

step 5: inputting the high-resolution historical precipitation sequence spatial distribution data and historical land-surface features as conditions into the distributed landslide stability model, and obtaining historical induced-landslide precipitation thresholds on the grids of the climate models;

step 6: comparing the historical induced-landslide precipitation thresholds on the grids of the climate models obtained in the step 5 with induced-landslide precipitation thresholds on the grids in the area obtained according to the observation precipitation data and optimized in the step 3, and thereby obtaining climate model historical grid precipitation thresholds;

step 7: according to the climate model historical grid precipitation thresholds obtained in the step 6, in combination with the distributed landslide stability model based on the physical process, obtaining a dangerous zone and a landslide influence zone of landslide disaster in a historical period; performing comparison on the historical induced-landslide precipitation thresholds on the grids of the climate models and calculating induced-landslide frequencies on the respective grids of the climate models in the historical period; then counting disaster loss grid data in the landslide influence zone in the historical period, and based on induced-landslide frequencies on the respective grids of the climate models in the historical period, calculating landslide disaster losses on the grids of the climate models in the historical period; wherein a formula for calculating the landslide disaster losses on the grids of the climate models in the historical period is as follows:

$$E_{his\_pop} = \sum_{i=1}^{n} A_{i\_his\_land} * F_{i\_his\_land} * P_{i\_his\_land}$$

where $E_{his-pop}$ represents the landslide disaster loss on the grids of the climate model in the historical period under the climate change scenarios; n represents a total amount of the grids in the area; i represents an index of each of the grids; $A_{i\_his\_land}$ indicates an i-th grid whether is in the landslide influence zone; if the i-th grid is in the landslide influence zone, a value of the $A_{i\_his\_land}$ is 1; if the i-th grid is not in the landslide influence zone, the value of the $A_{i\_his\_land}$ is 0; $F_{i\_his\_land}$ represents a predicted frequency of landslide disaster occurrence of the i-th grid; and $P_{i\_his\_land}$ is a landslide disaster loss on the i-th grid;

step 8: acquiring a spatial distribution of a simulated disaster-bearing body in a future scenario, based on the climate model historical grid precipitation thresholds obtained in the step 6, calculating landslide disaster losses on the grids of the climate models in a future period according to a process same as that of step 7, wherein a formula of calculating the landslide disaster losses on the grids of the climate models in the future period is as follows:

$$E_{fu\_pop} = \sum_{i=1}^{n} S_{i\_fu\_land} * R_{i\_fu\_land} * H_{i\_fu\_land}$$

where $E_{fu-pop}$ represents the landslide disaster loss on the grids of the climate model in the future period under the climate change scenarios; n represents the total amount of the grids in the area; i represents the index of each of the grids; $S_{i\_fu\_land}$ indicates an i-th grid whether is in a landslide influence zone in the future period; if the i-th grid is in the landslide influence zone in the future period, a value of the $S_{i\_fu\_land}$ is 1; if the i-th grid is not in the landslide influence zone in the future period, the value of the $S_{i\_fu\_land}$ is 0; $R_{i\_fu\_land}$ represents a predicted frequency of landslide disaster occurrence of the i-th grid; and $H_{i\_fu\_land}$ is a landslide disaster loss on the i-th grid in the future period; and step 9: evaluating a change of landslide disaster loss under climate change, and using a multi-climate model merging method to calculate a merged result of the twenty-four climate models; wherein a formula for the multi-climate model merging method is as follows:

$$P_{mul} = \sum_{k=1}^{K} W_k * M_k$$

where $P_{mul}$ represents the merged result of the climate models as calculated; k represents an index of each of the climate models; K represents a total amount of the climate models, and a value of the K is 24; $W_k$ represents a weighting factor of a k-th climate model among the climate models; and $M_k$ represents a result of the k-th climate model;

wherein the evaluation method further comprises: applying the merged result calculated in the step 9 in prevention and treatment of precipitation-induced landslide disaster in the area.

2. The evaluation method for evaluating a precipitation-induced landslide disaster loss under climate change according to claim 1, wherein the land-surface features in the step 1 comprise features of topography, surface coverings, geology and soil.

3. The evaluation method for evaluating a precipitation-induced landslide disaster loss under climate change according to claim 2, wherein in the step 1, the spline function method is formed based on a thin-plate spline theory and a climate data curved surface fitting theory and realized by using a PYTHON programming language to call an ANUSPLIN software.

4. The evaluation method for evaluating a precipitation-induced landslide disaster loss under climate change according to claim 3, wherein in the step 2, the distributed landslide stability model simulates a precipitation-infiltration process to establish a relationship between the safety coefficient and precipitation based on a limit equilibrium method of infinite slope.

5. The evaluation method for evaluating a precipitation-induced landslide disaster loss under climate change according to claim 4, wherein a formula of calculating the false alarm rate in the step 3 is as follows:

False alarm rate=correctly predicted number of landslide occurrence/a total occurrence number of the historical landslides.

6. The evaluation method for evaluating a precipitation-induced landslide disaster loss under climate change according to claim 5, wherein the step 3 further comprises: checking an effect of the induced-landslide precipitation thresholds.

7. The evaluation method for evaluating a precipitation-induced landslide disaster loss under climate change according to claim 6, wherein the four climate change scenarios in the step 4 comprise socioeconomic pathway 1 (SSP1)-2.6, SSP2-4.5, SSP3-7.0 and SSP5-8.5; and there are disaster loss grid data under each of pathways being SSP1-2.6, SSP2-4.5, SSP3-7.0 and SSP5-8.5.

8. The evaluation method for evaluating a precipitation-induced landslide disaster loss under climate change according to claim 7, wherein in the step 9, a formula of calculating the weighting factor $W_k$ of the k-th climate model among the climate models in the multi-climate model merging method is as follows:

$$W_k = \frac{C_k^\alpha}{\sum_{k=1}^{K} C_k^\alpha}$$

where $C_k^\alpha$ represents a correlation between the climate model and observation grid data; a value of a weight $\alpha$ is an integer in a range of 1 to 50; and the higher the correlation between the climate model and the observation grid data, the greater of the value of the weight $\alpha$.

9. An evaluation method for evaluating a precipitation-induced landslide disaster loss under climate change, comprising:
step 1: taking land-surface features of grids in an area as prediction variables, taking observation station precipitation sequence data of the area as a dependent variable, and performing interpolation on observation precipitation data with coarse-resolution of the grids in the area to generate high-resolution precipitation sequence spatial distribution data based on a spline function method;
step 2: inputting the high-resolution precipitation sequence spatial distribution data and the prediction variables into a distributed landslide stability model based on a physical process, simulating a dangerous zone and a landslide influence zone of landslide disaster according to corresponding precipitation thresholds of the grids obtained by simulating that a safety coefficient on each of the grids in the area reaches an instability threshold, and obtaining induced-landslide precipitation thresholds caused by land-surface features of the grids in the area;
step 3: performing comparative analysis on the induced-landslide precipitation thresholds and historical landslide data, calculating critical precipitation thresholds inducing historical landslides, calculating false alarm rates of induced-landslide precipitation threshold in the historical landslide data, and then obtaining a result corresponding to a minimum one of the false alarm rates by a trial-and-error method, and optimizing precipitation threshold conditions that induce landslides on the grids in the area;
step 4: acquiring global twenty-four climate models each with four climate change scenarios, and climate grid data thereof including historical grid data and future grid data; processing the historical grid data into high-resolution historical precipitation sequence spatial distribution data according to the spline function method of step 1; and processing the future grid data into high-resolution future precipitation sequence spatial distribution data according to the spline function method of step 1;
step 5: inputting the high-resolution historical precipitation sequence spatial distribution data and historical land-surface features as conditions into the distributed landslide stability model, and obtaining historical induced-landslide precipitation thresholds on the grids of the climate models;
step 6: comparing the historical induced-landslide precipitation thresholds on the grids of the climate models obtained in the step 5 with induced-landslide precipitation thresholds on the grids in the area obtained according to the observation precipitation data and optimized in the step 3, and thereby obtaining climate model historical grid precipitation thresholds;
step 7: according to the climate model historical grid precipitation thresholds obtained in the step 6, in combination with the distributed landslide stability model based on the physical process, obtaining a dangerous zone and a landslide influence zone of landslide disaster in a historical period; performing comparison on the historical induced-landslide precipitation thresholds on the grids of the climate models and calculating induced-landslide frequencies on the respective grids of the climate models in the historical period; then counting disaster loss grid data in the landslide influence zone in the historical period, and based on induced-landslide frequencies on the respective grids of the climate models in the historical period, calculating landslide disaster losses on the grids of the climate models in the historical period; wherein a formula for calculating the landslide disaster losses on the grids of the climate models in the historical period is as follows:

$$E_{his\_pop} = \sum_{i=1}^{n} A_{i\_his\_land} * F_{i\_his\_land} * P_{i\_his\_land}$$

where $E_{his\text{-}pop}$ represents the landslide disaster loss on the grids of the climate model in the historical period under the climate change scenarios; n represents a total amount of the grids in the area; i represents an index of each of the grids; $A_{i\_his\_land}$ indicates an i-th grid whether is in the landslide influence zone; if the i-th grid is in the landslide influence zone, a value of the $A_{i\_his\_land}$ is 1; if the i-th grid is not in the landslide influence zone, the value of the $A_{i\_his\_land}$ is 0; $F_{i\_his\_land}$ represents a predicted frequency of landslide disaster occurrence of the i-th grid; and $P_{i\_his\_land}$ is a landslide disaster loss on the i-th grid;
step 8: acquiring a spatial distribution of a simulated disaster-bearing body in a future scenario, based on the climate model historical grid precipitation thresholds obtained in the step 6, calculating landslide disaster losses on the grids of the climate models in a future period according to a process same as that of step 7, wherein a formula of calculating the landslide disaster losses on the grids of the climate models in the future period is as follows:

$$E_{fu\_pop} = \sum_{i=1}^{n} S_{i\_fu\_land} * R_{i\_fu\_land} * H_{i\_fu\_land}$$

where $E_{fu-pop}$ represents the landslide disaster loss on the grids of the climate model in the future period under the climate change scenarios; n represents the total amount of the grids in the area; i represents the index of each of the grids; $S_{i\_fu\_land}$ indicates an i-th grid whether is in a landslide influence zone in the future period; if the i-th grid is in the landslide influence zone in the future period, a value of the $S_{i\_fu\_land}$ is 1; if the i-th grid is not in the landslide influence zone in the future period, the value of the $S_{i\_fu\_land}$ is 0; $R_{i\_fu\_land}$ represents a predicted frequency of landslide disaster occurrence of the i-th grid; and $H_{i\_fu\_land}$ is a landslide disaster loss on the i-th grid in the future period;

step 9: evaluating a change of landslide disaster loss under climate change, and using a multi-climate model merging method to calculate a merged result of the twenty-four climate models; wherein a formula for the multi-climate model merging method is as follows:

$$P_{mul} = \sum_{k=1}^{K} W_k * M_k$$

where $P_{mul}$ represents the merged result of the climate models as calculated; k represents an index of each of the climate models; K represents a total amount of the climate models, and a value of the K is 24; $W_k$ represents a weighting factor of a k-th climate model among the climate models; and $M_k$ represents a result of the k-th climate model; and step 10: applying the merged result of the twenty-four climate models as a reference factor of geological disaster prevention and treatment in the area.

* * * * *